United States Patent
Westphal et al.

[11] Patent Number: 6,120,077
[45] Date of Patent: Sep. 19, 2000

[54] CLOSURE HAVING PULL HANDLE

[75] Inventors: Torsten Westphal, Wittingen; Bernhard Bendfeldt, Cremlingen; Gustav Hofmann, Braunschweig, all of Germany

[73] Assignee: Volkswagen AG, Wolfsburg, Germany

[21] Appl. No.: 09/143,479

[22] Filed: Aug. 28, 1998

[51] Int. Cl.$^7$ ................................................ B60N 3/12
[52] U.S. Cl. ........................ 296/37.13; 296/37.15; 296/37.8
[58] Field of Search ................ 296/37.13, 37.15, 296/37.8

[56] References Cited

U.S. PATENT DOCUMENTS

| | | | |
|---|---|---|---|
| 3,088,771 | 5/1963 | Weigle | 296/37.15 |
| 3,730,581 | 5/1973 | Parkinson | 296/37.13 |
| 4,453,760 | 6/1984 | Hira . | |
| 5,009,458 | 4/1991 | Shute | 296/37.13 |
| 5,261,716 | 11/1993 | Phelps | 296/37.8 |
| 5,499,853 | 3/1996 | Pourian | 296/37.13 |
| 5,535,571 | 7/1996 | Nichols . | |

FOREIGN PATENT DOCUMENTS

| | | | |
|---|---|---|---|
| 1127395 | 12/1956 | France | 296/37.13 |
| 1186582 | 2/1959 | France | 296/37.13 |
| 1255381 | 1/1960 | France | 296/37.13 |
| 1387647 | 12/1964 | France | 296/37.13 |
| 1095685 | 11/1956 | Germany | 296/37.13 |
| 2418790 | 10/1975 | Germany | 296/37.13 |
| 3406861 | 9/1985 | Germany . | |
| 4004084 | 8/1991 | Germany . | |
| 374081 | 8/1939 | Italy | 296/37.13 |
| 378020 | 10/1939 | Italy | 296/37.13 |
| 0230820 | 12/1984 | Japan | 296/370.13 |
| 406106991 | 4/1994 | Japan | 296/37.13 |
| 6279 | of 1884 | United Kingdom | 296/37.13 |
| 1305189 | 1/1973 | United Kingdom | 296/37.13 |

*Primary Examiner*—Joseph D. Pape
*Assistant Examiner*—Kiran Patel
*Attorney, Agent, or Firm*—Baker Botts L.L.P.

[57] ABSTRACT

In the particular embodiments described in the specification, a door providing a closure for an opening in a vehicle has an interior trim part which is connected by fasteners to the door frame and is formed with a trough covered with elastic netting to provide a storage compartment. The netting is supported by an upper rim member in the form of a flat flexible rod which also provides a pull handle for the door and, to absorb the pulling force, the rim member is fixed to the trim part at one end and is movably mounted through a spring at the other end.

18 Claims, 3 Drawing Sheets

CLOSURE HAVING PULL HANDLE

The invention relates to a closure capable of being articulated to a body and having a storage compartment with wall rim usable as a pull handle.

BACKGROUND OF THE INVENTION

Closures of this kind are known in a wide variety of embodiments in the form of vehicle doors. The most widespread storage compartments in vehicle doors at the present time have a plastic wall, either an integral component of an interior door trim or fastened to the latter by connecting elements. In the past, it has turned out that vehicle occupants occasionally tend to employ the wall rim of such a storage compartment as a pull handle, although above these storage compartments, in all vehicles of modern type, a door handle is always provided. This misuse of the storage compartment represents a severe strain on the attachment of the trim part, or of the storage container to the trim part, especially when a wide-open door is closed with a jerk. With constant repetition of this misuse, therefore, there is the danger that the compartment and/or the trim part may be torn away from the closure.

SUMMARY OF THE INVENTION

The object of the invention is to modify closures of this kind so that the danger of detachment as just described is reduced to a minimum.

This object is accomplished by a closure having a rim member for a storage compartment which.

According to the invention, then, for a closure member of this kind is constructed as an elastically flexible and/or variable-length member preferably in the nature of a rod, leaf, cord or the like—held to the closure or to a trim part attached to the closure, by at least one mounting device permitting a limited relative displacement of the member with respect to the closure and/or the trim part. As a result of this measure, in case of a jerking tension exerted on the wall rim, part of the force is first utilized to change the location and/or the shape of the member, and the remaining part is available to move the closure articulated to the body. The damping accompanying the relative displacement of the member with respect to the closure or the trim part thus accomplishes the controlled absorption of peak stresses, thus substantially diminishing the risk of tearing away the compartment. The limitation of travel of the wall rim makes it possible to restrict the maximum extensibility and hence the fill volume of the compartment to a preassigned measure. This is important especially when, with vehicle door closed, there is limited space available between the interior door trim and an adjacent vehicle seat. Thus the limitation of travel makes provision so that with the vehicle door open, the compartment is not enlarged so far into the interior of the vehicle as either to obstruct the closing of the door or, when the door is closed damaging or soiling the articles accommodated in the storage compartment, or the vehicle seat.

The invention is applicable especially to vehicle doors where the storage compartment is formed by a trough in the trim part, covered by an elastic netting. The member, preferably in rod or leaf form, is then fashioned for attachment of the netting as well.

Especially advantageous in tactile and visual terms are rod-shaped members having a cross-section of flat strip configuration. With such an embodiment, a comparatively wide netting rim can be made, convenient to the hand and readily incorporated stylistically into the trim part. Special attention should be paid to a storage compartment arrangement to which is so fashioned as to be pre-assemblable separately from the closure and/or the trim part as a preassemblable module. With such a design, trim parts already in mass production can be adapted to the invention with no great outlay. A releasable attachment of this storage compartment arrangement actually permits ready replaceability in event of repairs.

Certain assemblies are distinguished in that the storage compartment arrangement made as an independent module is hardly perceptible outwardly as a separate subassembly. Vehicle occupants gain the impression that the trough pertaining to the storage compartment and the remaining walls of the trim part are in one piece. Thus the storage compartment arrangement harmonizes visually with the entire interior door trim.

Vehicle doors are the preferred application of the invention. It is expressly noted here, however, that in principle the invention may also be applied to cabinet doors or window structures.

BRIEF DESCRIPTION OF THE DRAWINGS

An advantageous embodiment of the invention is represented in the drawing by way of example. Thus.

In all figures, like parts of features of parts bear the same numeration.

DESCRIPTION OF PREFERRED EMBODIMENTS

Figure 1:
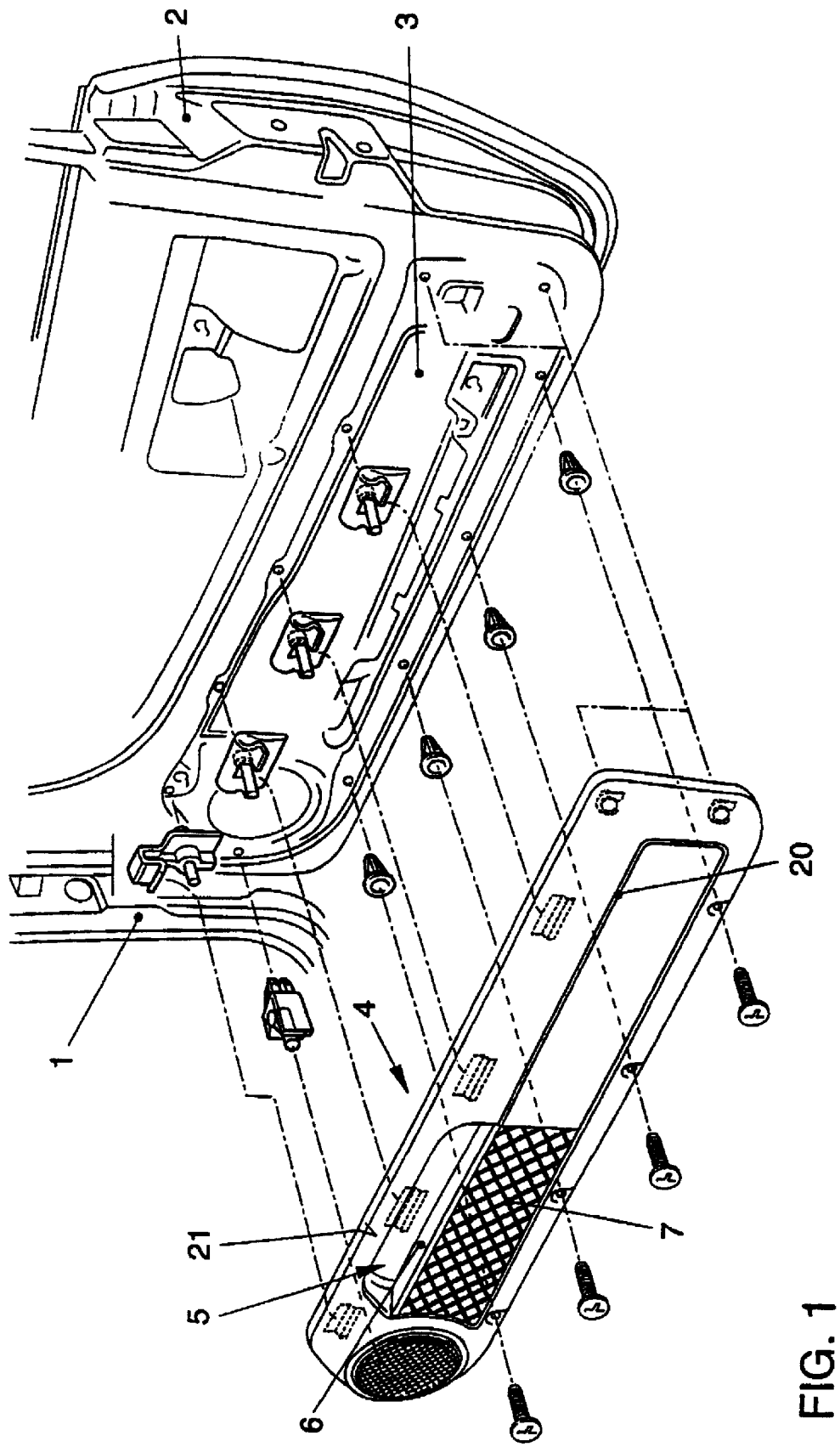
FIG. 1 shows an exploded view of a closure with parts essential to the invention.

A base body in the sense of the invention is here a vehicle body, as a component of which an A-column 1 is shown in FIG. 1. Attached to this as a closure member is a vehicle door 2, of which only a lower segment is visible here. To an interior sheet-metal door part 3, an interior trim part 4 is attachable by means of clip connections (no numeration). A storage compartment 5 in the interior door trim part 4 is formed by a trough 6 and netting 7. The detailed, construction of the compartment 5 may be seen in FIG. 2.

Figure 2:
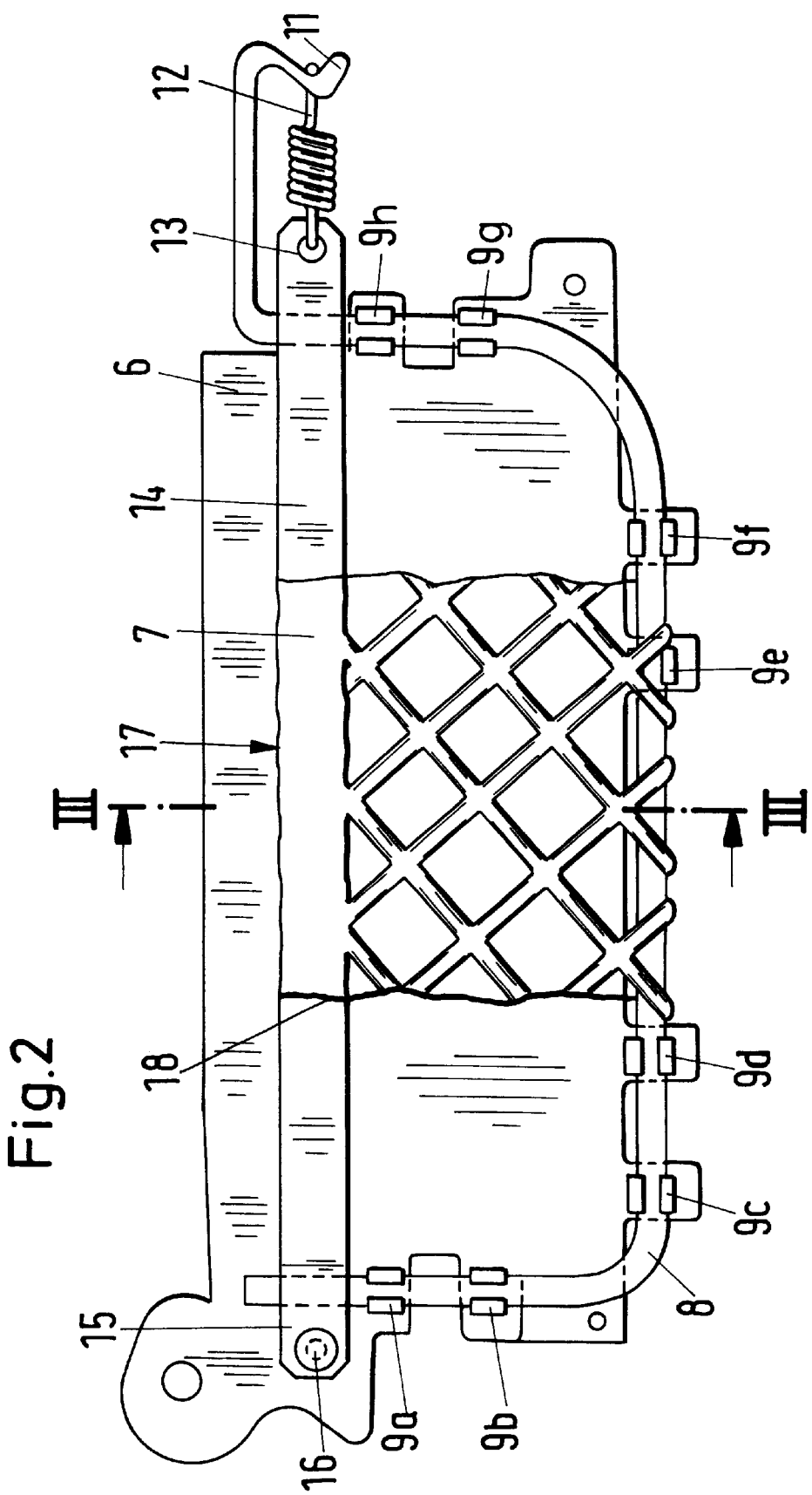
FIG. 2 shows a storage compartment arrangement capable of being installed in the closure according to FIG. 1.

The trough 6 is here configured as a module support, accommodating a holding frame 8 with clip elements 9a to 9h. These are here indicated as separate parts, held firstly in unnumbered recesses of the trough 6 by means of a foot part 10 (see FIG. 3); and hooked clamp-fashion over the holding frame 8, of round cross-section. The latter is bent out of a round rod with a molded-on stirrup segment 11, in which a spring element 12 is suspended. This also engages an opening 13 in an elastically flexible rim member 14, thus forming a movable mounting construction. The rim member 14 is rod-shaped and of flat strip cross-section (see FIG. 3). The end 15 of the rim member 14 opposed to the opening 13 holds it to the trough 6 by a fixed bearing 16. Such a fixed bearing 16 may for example take the form of a screw or rivet passing through the member 14 and fixed in the trough part 6. The rim member 14 is here practically laid upon the holding frame 11, together with which it forms a spreader frame for the netting 7, made of a textile fabric. For the sake of clarity, only a portion of this is shown in FIG. 2. In the region of an upper edge 17 of the netting, a tubular passage 18 is provided, through which the rim member 14 passes. As may be seen especially in FIG. 3, the region of the upper edge 17 of the netting may be used as a pull handle. The movable mounting construction in conjunction with the holding stirrup segment 11 and the spring element 12 ensures that when manual force is applied to the rim member 14 as indicated by the arrow 19, the maximum deflection of the rim member 14 and hence the lateral extensibility of the storage compartment 5 remain limited to a preassemblable quantity Δs.

In the design shown in FIG. 2, then, a portion of the closing pull is expanded both to deform the rim member 14 and to elongate the spring element 12 before the remainder becomes available to move the vehicle door 2. In departure from the embodiment shown in FIG. 2 by way of example, however, instead of the combination of a fixed bearing and a loose bearing, a floating bearing may for example be provided. Thus for example the rim member 14 may be articulated by way of spring elements at both ends, which elements may then be articulated to the holding frame 11 and/or to the interior door trim 4 and/or to the vehicle door 2 itself.

Instead of the clips 9a to 9h, clips molded directly on the trough 6 may be provided, so that the storage compartment arrangement shown in FIG. 2 can be built with even fewer parts. The holding frame 11 may be an arch of metal or plastic. As preferred material for the member 14, a spring steel of grade C 75 is proposed. With the designs shown in the figures, closing tensions of 500 N may be transmitted. As preferred material for the trough, a talc-reinforced polypropylene is proposed.

In this context, it should be specially mentioned that the holding frame 11 also stabilizes the trough 6 preferably made of plastic, in itself, so that a high geometrical stability can be ensured for the entire trough with relatively small wall thicknesses.

Figure 3:
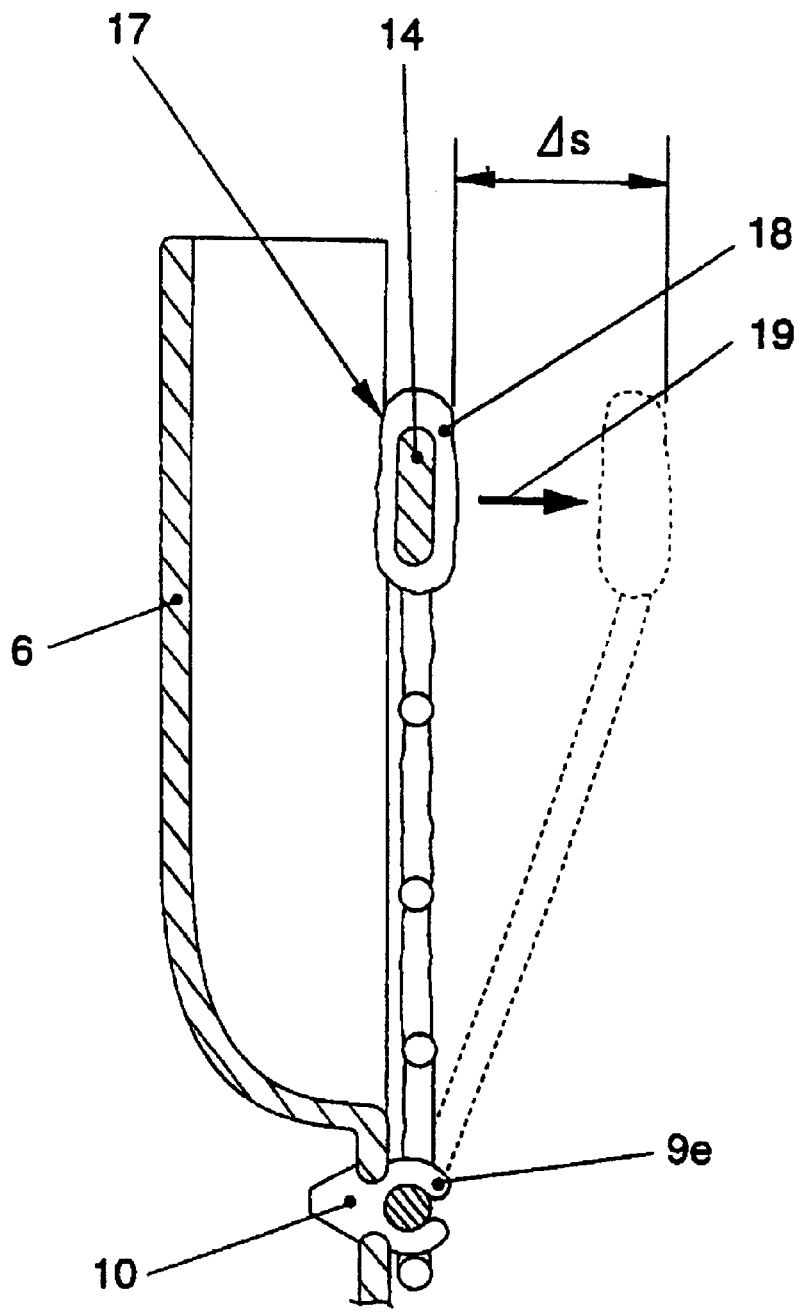
FIG. 3 shows a view in section at III—III in FIG. 2.

The storage compartment arrangement 5 executed according to FIGS. 2 and 3 may be eminently well integrated visually with the interior door trim part 4. For this reason, for example, FIG. 1 shows a joint 20, extending more or less flush with the upper edge of the netting 17 and in particular visually neutralizing the abutment between the trough 6 and a depression 21 in the interior door trim part 4.

What is claimed is:

1. A closure arranged for hinged attachment to a vehicle body for closing an opening therein comprising:
    a closure member provided with a storage compartment;
    a rim member for the storage compartment having first and second ends which is usable as a handle for the closure member, the first end being affixed to the closure member; and
    a spring member connecting the second end of the rim member to the closure member arranged to permit resilient relative displacement of the rim member with respect to the closure member and inhibit detachment of the rim member from the closure member upon use of the rim member as a handle to close the closure member.

2. A closure according to claim 1 wherein the closure member has a trim part formed with the storage compartment and the movable mounting for the rim member permits relative displacement in the trim part.

3. A closure according to claim 1 wherein the rim member has the shape of a flat strip.

4. A closure according to claim 1 wherein the rim member is made of spring steel.

5. A closure according to claim 1 wherein the rim member comprises a plastic material.

6. A closure according to claim 1 wherein the storage compartment is formed by a trough in a trim part of the closure member which is covered by netting.

7. A closure according to claim 6 including a holding frame for supporting the netting.

8. A closure according to claim 6 wherein the netting includes a tubular passage in which the rim member is received.

9. A closure according to claim 1 wherein the closure member is a vehicle door hinged to a vehicle body.

10. A closure according to claim 6 wherein the trim part is an interior door rim part.

11. A storage compartment arrangement for installation in a closure according to claim 1 wherein the walls of the storage compartment are formed in part by a trough of substantially fixed shape and in part by a netting, and wherein a holding frame supporting the netting is attached to the trough and the trough is fitted for attachment to a trim part in the closure member.

12. A storage compartment arrangement according to claim 11 wherein the spring member attaches the second end of the rim member to a fastening stirrup at one end of the holding frame.

13. A storage compartment arrangement according to claim 12 wherein the first end of the rim member is affixed to the trough.

14. A storage compartment arrangement according to claim 12 wherein the holding frame is connected by clips to the trough.

15. A storage compartment arrangement according to claim 14 wherein the clips are releasably clamped in the trough.

16. A storage compartment arrangement according to claim 14 wherein the clips are molded in and materially integral with the trough.

17. A storage compartment arrangement according to claim 11 including a trim part inserted in the closure having a trough-like depression with an edge contour adapted to an edge contour of the trough.

18. A storage compartment arrangement according to claim 17 including a joint at the upper edge of the netting which is formed at least partially by the trough and the trim part.

* * * * *